United States Patent [19]

Wang

[11] 4,447,028
[45] May 8, 1984

[54] UPPER SURFACE BLOWN POWERED LIFT SYSTEM FOR AIRCRAFT

[75] Inventor: Timothy Wang, Bellevue, Wash.

[73] Assignee: The Boeing Company, Seattle, Wash.

[21] Appl. No.: 206,174

[22] Filed: Nov. 12, 1980

Related U.S. Application Data

[63] Continuation of Ser. No. 116, Jan. 2, 1979, abandoned.

[51] Int. Cl.³ .......................... B64C 3/38; B64C 21/04
[52] U.S. Cl. .................................... 244/212; 244/207; 244/215
[58] Field of Search .......................... 244/207, 212–219

[56] References Cited

U.S. PATENT DOCUMENTS

| | | | |
|---|---|---|---|
| 3,583,660 | 6/1971 | Hurkamp et al. | 244/212 |
| 3,767,140 | 10/1973 | Johnson | 244/216 |
| 3,971,534 | 7/1976 | Grotz | 244/207 |
| 3,987,983 | 10/1976 | Cole | 244/216 |
| 4,019,696 | 4/1977 | Hirt et al. | 244/207 |
| 4,283,029 | 8/1981 | Rudolph | 244/215 |

FOREIGN PATENT DOCUMENTS 787011 11/1957 United Kingdom ................ 244/207

OTHER PUBLICATIONS

May et al., "Aerodynamic Design of the Boeing YC14 Advanced Med. STOL Transport", AIAA No. 75-1015, 1975.

Bowden et al., "Propulsion Integration for a Hybrid Propulsive-Lift Sys.", SAE 740471, 1974.

Skardahl et al., "Nozzle Development for the Upper Surface-Blown Jet Flap on the YC-14", SAE 740469, 1974.

Primary Examiner—Galen L. Barefoot
Attorney, Agent, or Firm—Hughes, Barnard & Cassidy

[57] ABSTRACT

In an aircraft having a pair of engines mounted forwardly of the wing and discharging jet exhaust over the wing for augmented lift, a trailing edge flap is positioned directly behind each of the engines. Each flap has a stowed position for the cruise mode, a rearwardly and downwardly extending position for maximum deflection of the jet exhaust downwardly for STOL operation, and various intermediate positions. The upper aerodynamic surface of each flap is curved in a manner that the radius of curvature increases along the chord length of the flap from the forward knee of the flap to the trailing edge of the flap. Each flap is moved from its stowed position, through intermediate positions to its fully deployed position in a manner that the upper aerodynamic surface of each flap forms a smooth and continuous extension of the fixed rear portion of the upper aerodynamic surface of the wing. Vortex generators are provided on the upper wing surfaces forward of flaps to generate vortices in the jet exhaust that travels over the upper surfaces of the flaps. This arrangement results in improved lift characteristics, reduced pitching moment with the flap in its deployed position, and improved operating characteristics.

80 Claims, 11 Drawing Figures

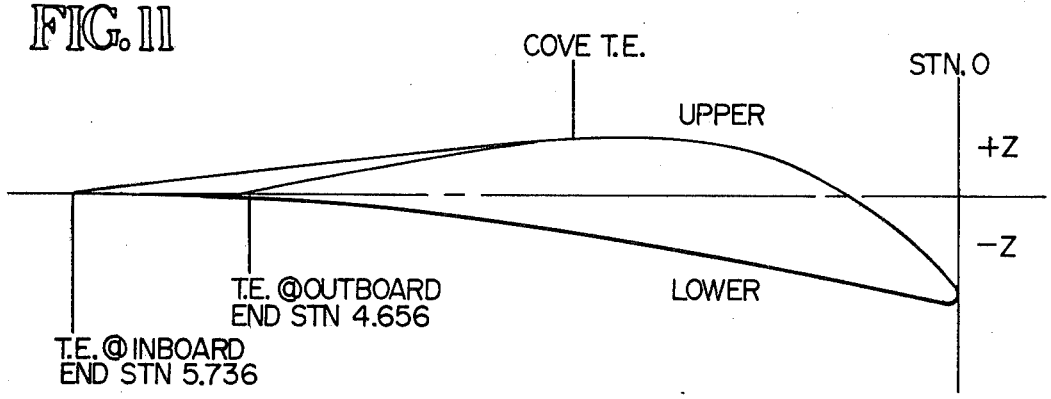

UPPER SURFACE BLOWN POWERED LIFT SYSTEM FOR AIRCRAFT

This is a continuation of application Ser. No. 000,116, filed Jan. 2, 1979 for UPPER SURFACE BLOWN POWERED LIFT SYSTEM FOR AIRCRAFT, now abandoned.

BACKGROUND OF THE INVENTION

A. Field of the Invention

The present invention relates to an upper surface blowing powered lift system in a STOL type aircraft.

B. Brief Description of the Prior Art

In recent years, increasing attention has been given to aircraft designs having the capability of efficient cruise at relatively high speeds, and also having the ability to take off and land in relatively short distances. Such aircraft are generally referred to as "STOL aircraft" (i.e. short take-off and landing aircraft). To develop adequate lift for the aircraft at low speed operation, such STOL aircraft commonly utilize the jet exhaust from the engines in combination with a flap system on the wing to divert the exhaust downwardly and thus increase lift.

One method of doing this is by blowing the jet exhaust over the upper surface of the wing, and utilizing downwardly extending trailing edge flaps to divert the exhaust downwardly by the Coanda effect. One such aircraft is shown in U.S. Pat. No. 3,977,630, Lewis et al, this patent being assigned to the assignee of the present invention. In the apparatus shown in that patent there is a high mounted wing, and a pair of mixed flow turbofan engines mounted on the wing to discharge their exhaust streams cordwise over the upper surface of the wing. There is a pair of trailing edge flaps, one behind each engine. The more forward flap of each pair is mounted on a first arm for rotation in a circular arc about a first axis of rotation. The rear flap of each pair is mounted to a second arm which is in turn mounted for rotation in a circular arc about an axis on the first arm which supports the forward flap.

Each pair of flaps has a stowed position where the flaps fit into a cove section at the aft end of the wing, and a deployed position where the two flaps are rotated downwardly and rearwardly. At the forward end of each flap is a small panel, with these panels being able to be moved to an upper position where they form with the upper surface of the wing and the upper surface of the two flaps a continuous aerodynamic surface. These two panels can also be moved to a down position to open slots at the forward ends of their two flaps. Thus, in the event of a loss of power, the panels of the flaps can be moved to the position to open the slots, thus decreasing drag on the wing.

With the two pairs of flaps in their fully deployed position, and with the flap panels closed, they define a downwardly and rearwardly curving aerodynamic surface at the trailing edge of the wing. The jet exhaust being discharged over the upper rear edge of the surface of the right and left wing sections follows this downwardly curved aerodynamic contour provided by the two pairs of flaps due to the Coanda effect, to develop a downward thrust.

Several years ago, experimental work was done relative to upper surface blown flaps, such as those described above, with this work being reported in a publication of the National Aeronautics and Space Administration, NASA SP-320, entitled "STOL Technology", further entitled "A Conference Held at Ames Research Center, Moffett Field, Calif., Oct. 17–19, 1971". In that publication, there are disclosed upper surface blown flap configurations where the radius of curvature at the forward portion of the flap is relatively small, and the radius of curvature is greater in the rear portion of the flap. However, it was found that with that particular flap configuration, it was necessary to "flatten" the jet exhaust so that the exhaust stream passing over the upper surfaces of the trailing edge flaps was relatively thin. This was necessary to enable the jet exhaust to follow the upper surface of the flap. While this "flattened" configuration of the jet was adequate for STOL operation, it produced too much drag for cruise operation, and therefore was less than totally satisfactory.

Another approach to an upper surface blown flap configuration is disclosed in a paper entitled "Propulsion Integration for a Hybrid Propulsive-Lift System," authored by M. K. Bowden, J. H. Renshaw, and H. S. Sweet. This paper was published by the Society of Automotive Engineers, and was presented at the Air Transportation Meeting, Dallas, Tex., Apr. 30–May 2, 1974. The paper bears a numerical designation "740471."

This paper describes a "hybrid power lift" system in which a portion of the fan air is directed through the interior of the wing to be blown over the upper surfaces of the trailing edge flaps of the wing. In addition, the exhaust from the engine is blown over the upper wing surface. Two flap configurations are shown, but the apparatus actually tested was significantly different. In one configuration, the upper surface of the flap has a more constant radius of curvature from the forward to the rear end. In a second configuration, the flap is identified as an "expanding Jacobs-Hurkamp flap" which has a sharper curvature at the knee point of the flap (i.e. a smaller radius of curvature), and a curvature having a substantially greater radius at the aft portion of the flap. An analysis of the data available concerning this arrangement indicates that the two flap configurations were competitive with one another and there was no particular advantage of using one as opposed to the other.

Possibly the prior art must relevant to the present invention is the YC-14 airplane developed by the Boeing Company, the assignee of the present invention. The main features of this airplane are described in "AIAA Paper No. 75-1015", entitled "Aerodynamic Design of the Boeing YC-14 Advanced Medium STOL Transport (AMST)", authored by Fred W. May and George E. Bean. This paper is believed to have been presented at the AIAA 1975 Aircraft Systems and Technology Meeting at Los Angeles, Calif., Aug. 4–7, 1975. Other aspects of the YC-14 airplane are described in a publication of the Society of Automotive Engineers, entitled "Nozzle Development for the Upper Surface Blown Jet Flap on the YC-14 airplane", authored by Howard Skavdahl, Timothy Wang, and William J. Hirt. It is believed that this paper was presented at the air transportation meeting, Dallas, Tex., Apr. 30–May 2, 1974.

The YC-14 uses the upper surface blown concept generally as described in the aforementioned U.S. Pat. No. 3,977,630, Lawis et al. This airplane has a twin engine, high wing configuration. The two engines are mounted on the wing very close to the fuselage (known as a "shoulder mount") with the jet exhaust passing over the upper surface of the wing. There is a constant section, two segment, upper surface blown flap behind each engine. Also, there are tapered, double slotted mechanical flaps outboard of the upper surface blown flaps.

The two engines of the YC-14 have a mixed flow exhaust nozzle (i.e. where the primary and fan flow are combined), with the nozzle having a door on the outboard side to allow jet exhaust to spread outboard, thereby thinning the jet and increasing its span for better turning by the Coanda effect. The door is closed in cruise to maintain a narrower jet width, thus reducing interference and scrubbing drag.

Behind each jet nozzle, there are four retractable vortex generators which are used to aid in turning the jet exhaust downwardly over the upper surface blown flap at higher deflection angles. In the AIAA paper noted above, it is noted that the Coanda turning is enhanced by the presence of the vortex generators.

The two sections of each upper surface blown flap rotate about a simple hinge and form a sealed continuous surface behind the exhaust nozzle when these sections are in their downwardly and rearwardly extending position. In any of the deployed positions, the upper surface of the blown flap is designed to approximate a circular arc of 68" radius, which is about twice the maximum height of the nozzle exit. In the event of engine failure with the upper surface blown flaps in their extended position, the forward flap segment behind the failed engine will rock on a pivot to transform the flap into a conventional double slotted flap.

One of the major considerations in designing an upper surface blown flap system is the ability to turn the jet exhaust at full deflection of the upper surface blown flaps. Early development of upper surface blown flap technology concentrated on methods of reducing jet thickness and increasing radius of flap curvature. As mentioned in early literature, Coanda flow turning depends strongly on the ratio of jet thickness to turning radius. For a given jet Mach number, a maximum ratio exists above which flow turning is poor. This early observation can be explained by elementary fluid mechanics as follows. Poor turning is a result of flow separation when the boundary layer can no longer overcome the retarding force of an adverse pressure gradient along the flap surface. The magnitude of the adverse pressure gradient increases with increasing jet thickness. Thus, one way to avoid flow separation (i.e. achieve good turning) is to thin down the jet and reduce the adverse pressure gradient.

However, while a thin jet is desirable for proper turning with full flap deflection, it is not desirable for cruise mode because of the high drag resulting from the thin jet passing over the air foil. While the prior art developments noted above (i.e. the hybrid propulsive lift system and the Boeing YC-14 upper surface blown life system) do represent advances in the state of the art in that improved jet turning was achieved, prior to the present invention, to the best knowledge of the applicant, proper turning of the jet under conditions of full flap deflection could not be achieved without thinning the jet to an extent that is less than totally desirable for cruise mode. As will be disclosed later herein, the upper surface blown flap system of the present invention permits the use of a thicker jet exhaust (which in turn means reduced drag) to permit greater efficiencies in the cruise mode.

With regard to the overall operating characteristics of an upper surface blown flap system, there are in general three major considerations. First, there is the important consideration of the flap system being able to develop adequate lift to accomplish the design objectives of the aircraft, and this is directly related to the ability to turn the jet exhaust over the upper surface blown flap. Second, since the augmented lift developed by the flaps in their deployed position results from the downward deflection of the jet exhaust at the trailing edge of the wing, there is the consideration that the center of lift in the wing will to some extent move rearwardly in the STOL mode of operation and thus develop a pitching moment. This pitching moment is usually counteracted by using the horizontal tail and the elevators of the aircraft to develop a counter moment. To optimize the control characteristics of the airplane it is more desirable that any shift in the center of lift in the wing be kept to a practical minimum.

A third consideration is the capability of utilizing the flaps in a manner to control the aircraft on its glide path. Since the jet engine does not always respond with sufficient rapidity to move from a lower to a higher power setting or vice versa, the flaps of an airplane are utilized to increase or decrease lift, or vary the drag on the wing to maintain the plane on the proper glide path. The upper surface blown flaps in a STOL aircraft can be used for this purpose, since they can effectively vary the rearward and downward thrust components by moving the flaps to different positions. Thus, an important consideration becomes the ability of the upper surface blown flaps in a STOL aircraft to respond in a manner to provide desired control characteristics for the aircraft.

While the apparatus described above does represent advances in the art, there is continuing effort to make improvements. Thus the present invention has for its main objective, the improvement in the performance of a flap system utilized for an aircraft having an upper surface blown powered lift system such as those described above.

With regard to the prior art disclosed from a search of the patent literature, the following are noted:

U.S. Pat. No. 2,334,070 discloses broadly the concept of blowing air over an upwardly facing convexly curved aerodynamic surface to improve lift.

U.S. Pat. No. 2,386,987, Stalker, discloses a flap system in which there are slots at the leading edge of the flaps. Air can either be blown in or sucked out of the slots. U.S. Pat. No. 2,449,022, Stalker, shows a flap system where air is sucked into the flaps so as to reduce drag.

U.S. Pat. No. 2,517,524, Beck et al, discloses a flap system where boundary layer air is sucked away for an improved aerodynamic effect.

U.S. Pat. No. 2,555,862, Romani, discloses a particular configuration of a trailing edge flap for wings having high sweep angles. This patent does not deal with the problem of augmented lift by upper surface blowing.

U.S. Pat. No. 2,844,337, MacArthur et al, shows a system where air is blown over the upper surface of a trailing edge flap to remove an inert boundary layer from the flap.

U.S. Pat. No. 2,876,966, Cook, shows a flap system where suction is applied to the surface of the flap through a porous surface.

U.S. Pat. No. 2,910,254, Razak, shows a byplane where air is sucked over the lower wing flap and blown over the upper wing flap.

U.S. Pat. No. 2,978,207, Davidson, discloses the concept of mounting an engine within the wing, and discharging the exhaust directly over the trailing edge flap, without first passing the exhaust over the upper surface of the main wing portion. The flap has a uniformly curved forward surface portion and a substantially straight surface contour rearwardly of the forward curved portion.

U.S. Pat. No. 3,012,740, Wagner, relates to an aircraft boundary layer control system. Air is drawn in at one portion of the wing and discharged over the wing at another portion.

U.S. Pat. No. 3,018,983, Davidson, shows an upper surface blown flap system where diverters can be placed rearwardly of the jet exhaust to deflect it downwardly.

U.S. Pat. No. 3,139,248, Alvarez-Calderon, discloses a wing which can have its spanwise length varied by pivotally mounting the outside portion of the wing about a cordwise axis. Thus, the two outside wing portions can be swung downwardly and inwardly to a position beneath the two inboard wing sections to form two wing members of lesser spanwise length. The two outboard wing sections can be swung outwardly to their outwardly deployed position to form wings of greater spanwise length.

U.S. Pat. No. 3,259,341, Steidl, discloses a concept for an airfoil where air is blown from within the wing over the upper surface of a trailing edge flap.

U.S. Pat. No. 3,347,495, Eberhartd et al, discloses an aircraft where flow is directed over the upper surface of a trailing edge flap. Compressed air is directed into ejector nozzles which in turn direct the air over the trailing edge flap.

U.S. Pat. No. 3,438,599, Welzen, discloses an airfoil with a trailing edge flap which is movable on a curved track from a stowed to a deployed position. The patent does not relate to upper surface blowing over a trailing edge flap.

U.S. Pat. No. 3,614,028, Kleckner, discloses a STOL aircraft where a portion of the efflux from the fan section of a jet engine passes over the wing of the aircraft, while the main discharge of the jet engine passes under the wing. A trailing edge flap is utilized to direct the jet flow downwardly for STOL operation.

U.S. Pat. No. 3,756,540, Williams, discloses an airfoil which is divided into five sections along the cord length, each section producing a specialized flow with respect to the aerodynamic surface. The trailing edge is formed in a Coanda profile, and a tangential jet slot is provided to go over and around the Coanda profile to prevent flow separation and move the stagnation region aft on the wing.

U.S. Pat. No. 3,778,009, Jones, discloses a trailing edge device having a pair of members which can be extended or inflated to produce what is described generally as a semi-cylindrical profile. Air is blown over this semi-cylindrical profile from one or more naturally or forcibly blown slots to achieve boundary layer control.

U.S. Pat. Nos. 3,837,601, and 3,987,983, the inventor in both of these patents being James B. Cole, both disclose trailing edge flap configurations generally similar to those disclosed in the above-mentioned U.S. Pat. No. 3,977,630, Lewis et al patent.

U.S. Pat. No. 3,971,534, Grotz, discloses an upper surface blown flap system where two sets of vanes are positioned immediately rearwardly of the jet nozzle to deflect the jet flow outwardly.

U.S. Pat. No. 3,974,987, Shorr, discloses a flap system where compressed air is blown over the upper surface of the flap to help smooth the boundary layer.

U.S. Pat. No. 3,985,319, Dean et al, discloses a linkage system for a pair of trailing edge flaps. Two sets of four bar linkages are provided, one for each flap, and these swing the flaps downwardly and rearwardly to a deployed position.

U.S. Pat. No. 4,019,696, Hart et al, discloses an upper surface blown flap system using vortex generators in a manner somewhat similar to the vortex generators of the YC-14 airplane.

British Patent Specification No. 1,178,312, discloses a flexible trailing edge flap which can be positioned in the manner to achieve the Coanda effect. This patent specification states that the flap should have a substantially uniform curvature for best performance.

SUMMARY OF THE INVENTION

In the upper surface blown powered lift system of the present invention, there is an airfoil having a chordwise axis, a leading edge, a trailing edge, an upper aerodynamic airfoil surface, and a cove portion at the trailing edge.

There is a flap member having a forward end and a rear end, and having an upper aerodynamic flap surface with a forward portion and a rear portion. The flap member has a stowed position in the cove portion and a deployed position where the forward portion is positioned adjacent a trailing edge portion of the airfoil upper aerodynamic surface to form a continuous aerodynamic contour with the trailing edge portion and with the upper aerodynamic surface of the flap member extending downwardly and rearwardly from the trailing edge portion.

Jet means directs a high velocity jet flow rearwardly over the upper aerodynamic airfoil surface and over the upper aerodynamic flap surface. vortex generating means is mounted rearwardly of the jet means to produce vortices in the jet flow over the flap member.

The upper aerodynamic surface of the flap member is curved in a generally chordwise direction with a radius of curvature which is smaller at the forward portion of the upper aerodynamic flap surface and greater at the rear portion of the upper aerodynamic flap surface. The radius of curvature increases rearwardly along the forward portion of the upper aerodynamic flap surface.

There is actuating means to move the flap member between its stowed position and its fully deployed position, and also to intermediate positions between its stowed and fully deployed positions. The actuating means is arranged to rotate the flap member rearwardly with a moveable instantaneous center of rotation, with the upper aerodynamic surface of the flap member being adjacent to and generally aerodynamically aligned with the wing upper aerodynamic surface at the cove rear edge portion.

Thus, the flap member can be placed in a stowed position for travel in cruise mode and deployed downwardly to create a desired downward deflection of the jet flow, in a manner that jet flow travelling at the forward end of the flap member travels over the forward end in a curved path of gradually increasing lesser radius of curvature and the jet flow travels over the rear end of the flap member in a curved path of greater radius of curvature.

Desirably, the upper aerodynamic surface of the flap member is arranged relative to the actuating means so that a portion of the flap upper aerodynamic surface adjacent the cove rear edge portion during deployment of the flap member from one position to another position has a varying curvature. The radius of curvature of the flap upper aerodynamic surface portion generally matches a change in a instantaneous center of rotation of the actuating means in a manner that the portion of the flap aerodynamic surface adjacent the cove rear edge portion is aerodynamically aligned when the trailing edge portion of the flap member is deployed from the one position to the other position.

The upper surface of the flap member has a minimum radius of curvature at the forward portion, and the jet means has an exhaust nozzle with a predetermined effective height dimension. The exhaust nozzle is so arranged relative to the minimum radius of curvature of the upper flap surface that there is a nozzle height to minimum radius of curvature ratio greater than approximately one half. This ratio can be at least as high as three quarters, and possibly as high as approximately one.

The nozzle has an effective nozzle discharge area and a maximum height dimension. The discharge nozzle has an aspect ratio which is equal to the effective nozzle area divided by the square of the height dimension with the aspect ratio being less than two and a half. This aspect ratio can be as low as no greater than approximately two and a quarter, and even as low as no greater than approximately two.

In the preferred form, the flap member has a stowed position in the cove portion of the airfoil, with the forward portion of the upper flap surface being positioned in the cove portion of the airfoil, and with the rear portion of the upper flap surface forming a continuous rearward extension of the upper airfoil for a cruise mode. In this configuration, the radius of curvature of the rear end of the forward portion of the upper flap surface is between about ten percent to thirty percent greater than the radius of curvature of the front end of the forward portion of the flap upper surface.

Desirably, the radius of curvature of the rear end of the forward portion is about one fifth greater than the radius of curvature at the front end of the forward portion. Preferably, the forward portion of the upper flap surface is contoured in a spiral curve.

An additional feature of the present invention is that an inboard side of the flap member, with the flap in its downwardly extending deployed position, the slope at a rear inboard portion along the chord length thereof is less than the slope at a rear outboard portion along the chord length of the flap member. Also the chord length from outboard to inboard increases in an inboard direction. This results in a "taper" and "twist" designed to relax the adverse pressure radiant next to the side of the fuselage, and in practice reduce the extent of local flow separation.

In the particular arrangement shown herein, the present invention is shown mounted to an aircraft having a fuselage and a wing, with two jet engines mounted to the wing on opposite sides of the fuselage. There is a pair of flap members positioned on opposite sides of the fuselage, each flap member behind a related jet engine. In like manner, there are two vortex generating means, one behind each jet engine, and actuating means provided for each flap.

In the method of the present invention, there is provided an airfoil, a flap member, jet means, and vortex generating means as described previously herein. The flap member is rotated between its stowed position and its fully deployed position and also to intermediate positions in a manner that the flap member rotates about a moveable instantaneous center of rotation. Desirably the instantaneous center of rotation matches the radius of curvature of the flap upper aerodynamic surface in a manner that the portion of the flap upper aerodynamic surface adjacent the cove rear edge portion is aerodynamically aligned with the trailing edge portion of the airfoil as the flap member is deployed from one position to another.

Other features of the present invention will become apparent from the following detailed description.

BRIEF DESCRIPTION OF THE DRAWING

FIGS. 7, 8 and 9 are three graphs which compare the performance characteristics of the system of the present invention with those of the system used in the prior art YC-14 aircraft at a constant gross thrust coefficient as follows:
 a. FIG. 7 plots lift coefficient against angle of attack of the wing;
 b. FIG. 8 plots the lift coefficient against the drag coefficient of the wing;
 c. FIG. 9 plots the lift coefficient against the pitching moment of the wing to which the flaps are mounted:

FIG. 11 is a side elevational view of a flap member of the present invention tested in a wind tunnel.

DESCRIPTION OF THE PREFERRED EMBODIMENT

Figure 1:
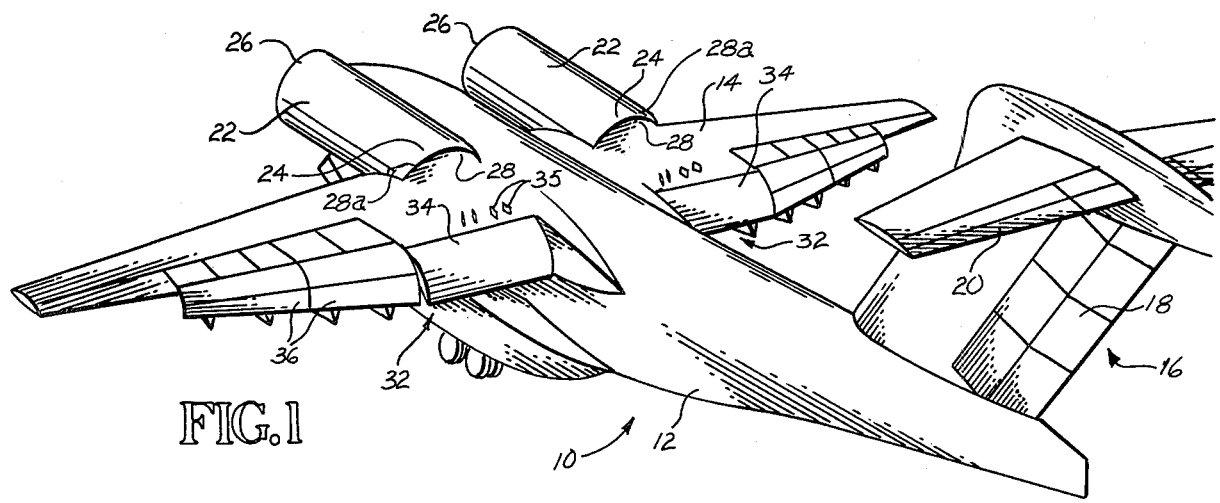
FIG. 1 is an isometric view of an aircraft, having an upper surface blowing powered lift system incorporating the present invention.

To describe the preferred embodiment of the present invention, the introduction version of the YC-14 aircraft of the Boeing Company is described herein as a typical STOL configuration of an aircraft incorporating the present invention. This airplane 10, is shown in FIG. 1, this airplane 10 being a STOL aircraft (i.e. short take-off and landing aircraft) having an upper surface blowing powered lift system. In the particular configuration shown herein, this airplane 10 comprises a fuselage 12, a high mounted wing 14, and a tail section 16 having a rudder 18 and an elevator section 20. There are two engines 22 positioned closely adjacent to and on opposite sides of the fuselage 12. Each engine 22 has a rear exhaust nozzle 24 mounted behind the leading edge of the wing 14, and a forward inlet end 26 extending forwardly of the wing leading edge. In the particular aircraft 10 shown herein, the two engines 22 are turbofan engines having a mixed flow nozzle configuration, with the flow from each engine being discharged through a rear nozzle 28 over the upper surface 30 of the wing 14.

Of particular significance in the present invention is a trailing edge flap system, generally designated 32, comprising a trailing edge flap member 34, with two such flap systems 32 being provided, one behind each of the engines 22. Also of significance in combination with these particular flaps 34 are vortex generators 35 positioned on the upper surface 30 of the wing 14 behind the engine nozzles 28 and forward of the flap members 34. Conventional trailing edge flap members 36 are provided on the wing 14 at locations outboard of the flap members 34. However, the present invention is not directly concerned with the configuration and operation of these flap members 36, and these are or may be of conventional design. It is believed that a better appreciation of the novel features of the present invention will be obtained by first describing the overall operating characteristics of the airplane 10 and then describing the particulars of the flap systems 32.

When it is desired to operate the aircraft 10 in its cruise mode, the flap members 34 (and also the outer flap members 36) are moved into their stowed positions, where the chordwise axis of the flap members 34 and 36 are generally aligned with the chordwise axis of the wing 14, with the wing thus operating efficiently in the cruise mode. When the airplane 10 is approaching an airfield or landing, the outer flap members 36 are rotated downwardly in a conventional manner to augment lift for lower speed of the aircraft. The flap members 34 are also rotated downwardly and rearwardly, but function in a somewhat different manner. Each flap member 34 provides an upper aerodynamic surface 38 which directs the jet exhaust which has traveled over the wing surface 30 in a downward and rearward direction, thus using the jet exhaust itself to augment lift. As indicated earlier, the phenomenon by which this turning is accomplished is commonly known as the Coanda effect.

In the present invention the jet exhaust leaving the nozzle 28 is highly three dimensional (i.e. has substantial depth relative to its width) and has a high velocity relative to the adjacent airstream. The vortex generators 35 create counterrotating vortices in the jet stream which then proceeds over the upper surfaces 38 of the flaps 34 in a curved path rearwardly and downwardly over the upper surface 38 of its related flap 34.

As in the prior art YC-14 airplane, each of the nozzles 28 is provided with a door on the outboard side of the nozzle. (In FIGS. 1 and 2, the location of this door is indicated at 28a. However, for ease of illustration, the details of door 28a are not disclosed herein.) In cruise mode, door 28a is closed to provide optimum exit area for minimum cruise specific fuel consumption. However, when the flaps 34 are deflected downwardly, either for take-off or landing, each door 28a is opened laterally (see FIG. 2) to provide maximum exit area for thrust. In addition to its impact on engine performance, each door 28a helps to provide the different jet characteristics desired for good powered lift performance and low cruise drag. With the door 28a open, the nozzle internal lines are tailored to induce lateral spreading of the jet over the upper surface blown flap span resulting in efficient Coanda turning characteristics. With the door 28a closed at cruise pressure ratios, the nozzle shape induces a convergence of the exhaust flow downstream of the exit resulting in minimum scrubbing of the wing surface.

Figure 4:
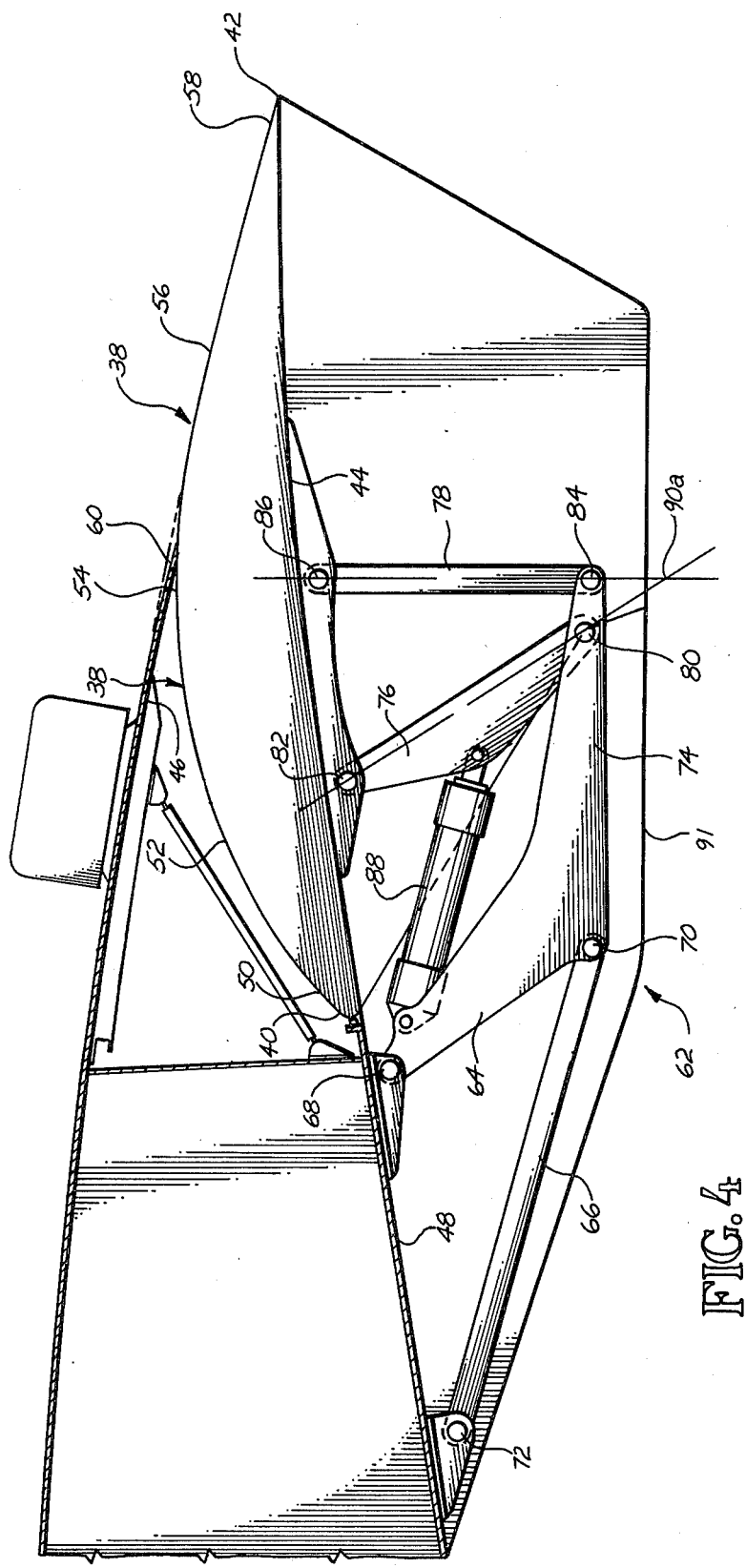
FIG. 4 is a sectional view of the present invention, taken along the chord axis of the wing of the aircraft, illustrating the flap in its stowed position.

To describe a first embodiment of the system of the present invention, reference is first made to FIG. 4, which shows the flap member 34 in its stowed position. The flap member 34 has a forward knee portion 40, a trailing edge portion 42, the aforementioned upper aerodynamic surface 38, and a lower surface 44. The flap 34 is stowed in a "cove portion" 46 at the rear end of the wing 14. In the stowed position, the lower surface portion 44 is generally aligned with the lower aerodynamic surface 48 of the wing 14, and the rear portion of the upper flap surface 38 is aligned with the upper aerodynamic surface 30 of the wing 14, with the forward portion of the upper flap surface 38 being positioned within the cove 46 of the wing 14.

The contour of the upper flap surface 38 may be described, with further reference to FIG. 4, in two parts, namely: the forward part within the wing cove 46 and the rear part aft of the wing cove 46. The latter forms a continuation of the wing upper surface contour 30, in a manner to insure an efficient air foil section for cruise. The forward part of the upper flap surface 38 is such that it remains in contact with an upper trailing edge section of the wing surface 30 at any and all extended positions. In the preferred embodiment of the present invention, the contour of the forward part can be closely approximated by a logarithmic spiral with the initial radius of curvature at the knee portion 40 being at a minimum. The radius of curvature of the flap upper surface contour then increases continuously to blend into the wing contour at the rear part of the flap upper surface. The logarithmic spiral contour is significant in the present invention to obtain maximum deflection of the flap 32.

For the purposes of analysis, consideration will be given to five locations along the chordwise length of upper surface 38 of the flap 34 at the midchord 47 of the flap 34. (See diagrams 3 and 4.) These five locations are: the most forward location 50 immediately adjacent the forward end 40; an intermediate forward location 52 midway along the forward part of the surface 28; a transition location 54, where the flap surface 38 meets the trailing edge 60 of the upper wing surface 30, when the flap 32 is in its stowed position; an intermediate rear location 56 at the mid length of the rear part of the flap upper surface 38, and finally a rear location 58 immediately adjacent the trailing edge 42 of the flap 34. The flap surface 38 is so contoured that the radius of curvature of the surface 38 is at a minimum at the location 50, and increases in a logarithmic spiral contour to the transition location 54. Thereafter, the radius of curvature is dictated primarily by the aerodynamic configuration of the upper wing surface 30 so that the radius of curvature would be substantially greater between the locations 54 and 58.

Figure 5:
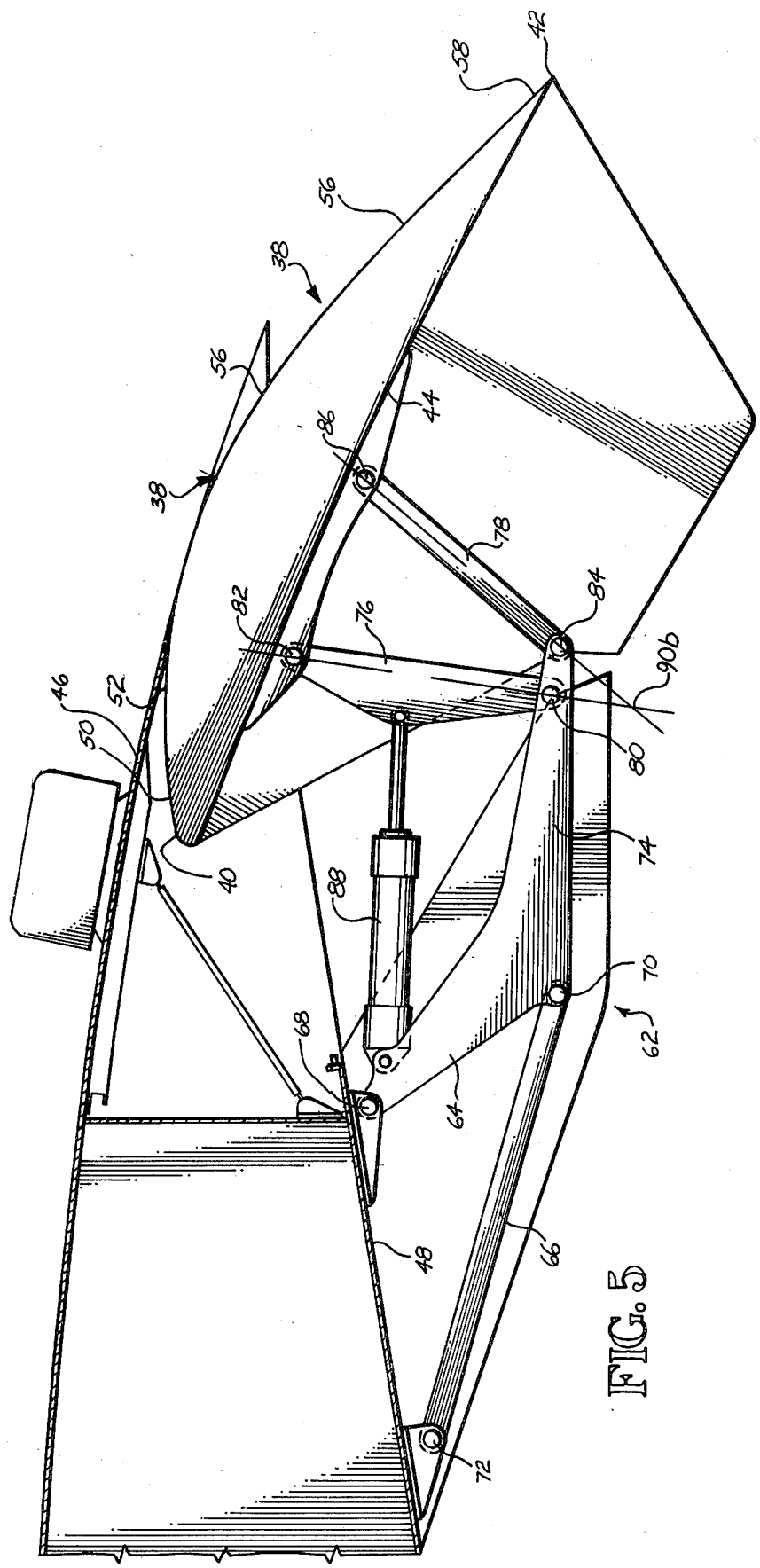
FIG. 5 is a view similar to FIG. 4, showing the flap in an intermediate deployed position.
Figure 6:
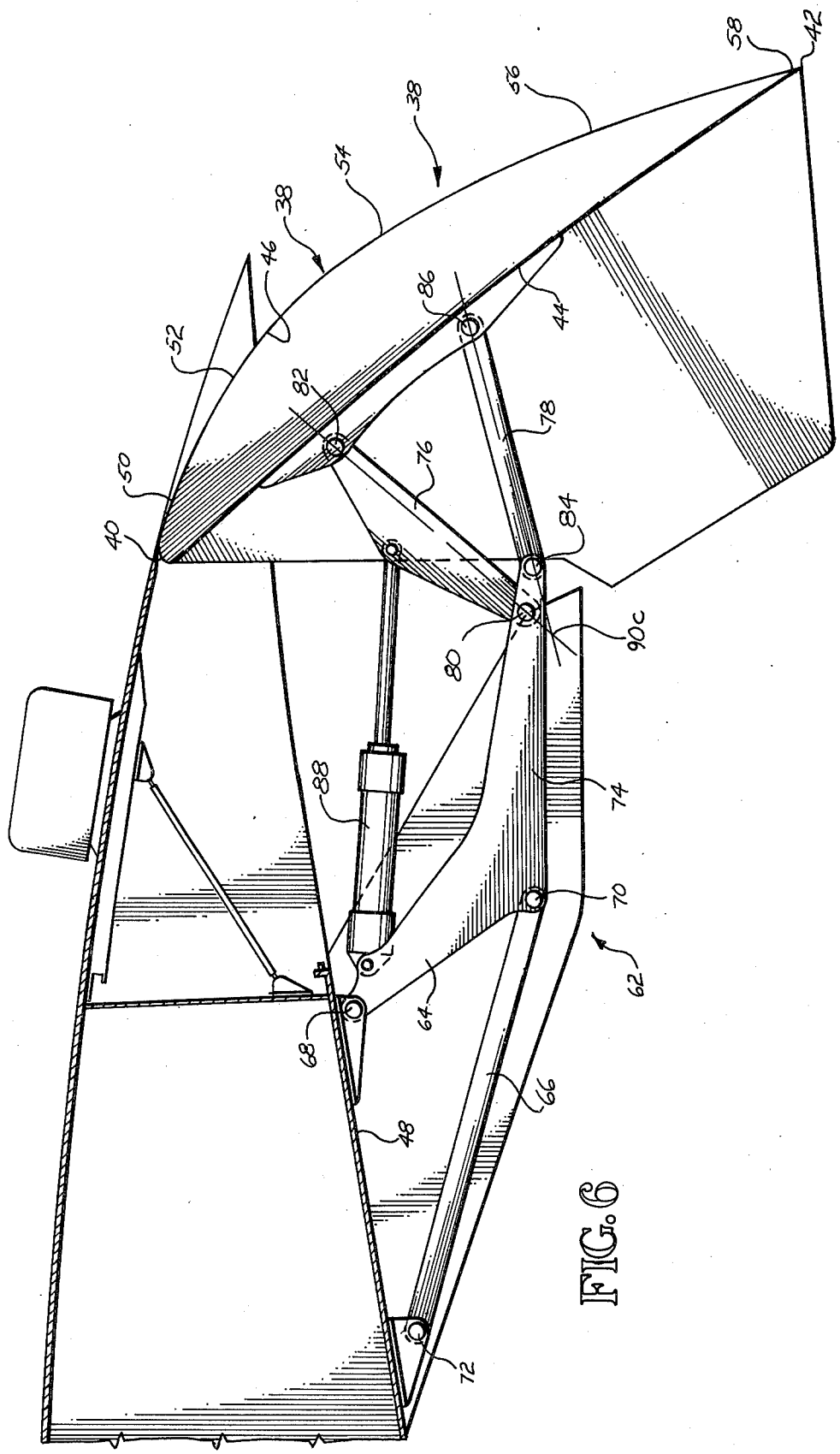
FIG. 6 is a view similar to both FIGS. 4 and 5, showing the flap in its fully deployed position.

The flap 34 is moved from its stowed position (shown in FIG. 4) through intermediate positions (one of which is shown in FIG. 5) to its fully deployed position (shown in FIG. 6) in such a manner that the portion of the flap aerodynamic surface 38 which is adjacent the trailing edge 60 of the upper wing surface 30 at the location of the cove portion 46 is in contact with and nearly tangent to that trailing edge surface 60. Thus, the exposed portion of each of the flap surfaces 38 forms with the upper wing surface 30 a substantially continuous upper aerodynamic surface, with the radius of curvature being at a minimum at the location immediately aft of the trailing edge 60, and increasing gradually to the location 58. When the flap member 34 has reached its fully deployed position as shown in FIG. 6, the aerodynamic contour 30-38 provided by the wing 14 and the flap member 34 is such that the radius of curvature at the location immediately aft of the cove trailing edge 60 is at a minimum.

In a typical installation, let it be assumed that the engine 22 is a fan jet engine having a mixed flow nozzle configuration, with this engine 22 having a bypass ratio of four to one. Let it further be assumed that the two engines 22 are mounted in a manner that the exhaust nozzles 28 thereof are approximately seven feet from the trailing edge 60, and that the height of the engine exhaust nozzle opening 28 is 36 inches, and width of the nozzle opening 28 at the location immediately adjacent the wing 14 is 106 inches. In such an installation, the radius of curvature at the various locations 50-58 on the upper flap surface 38 would be approximately as follows:

Radius at location 50: fifty inches
Radius at location 52: fifty five inches
Radius at location 54: sixty inches
Radius at location 56: 120 inches
Radius at location 58: 3000 inches The radius at the locations 56 and 58 could be substantially greater or possibly less depending on the overall configuration of the wing surface 30, and could even be at infinity. The particular linkage by which each flap member 34 is moved between its stowed and fully deployed position is described in more detail in a pending U.S. patent application, being filed concurrently with the present application, assigned to the assignee of the present application and entitled, "Trailing Edge Flap Actuating System for Upper Surface Blowing Powered Lift Systems for Aircraft", with the inventor being Peter K. C. Rudolph. One embodiment of that actuating mechanism is illustrated herein in FIGS. 4-6 and is generally designated 62.

The actuating mechanism 62 has a main stationary mounting arm 64 and a stationary stability link 66. The mounting arm 64 has a forward end 68 connected to the lower side of the wing 14 and an intermediate portion 70 connected to a rear end of the link 66, with the forward end of the link 68 being connected at 72 to the underside of the wing 14 at a location forwardly of the connecting location 68. The arm 64 has a rearwardly extending mounting portion 74 which is thus held in a stationary position by the three point connection 68-70-72.

Pivotally connected to the rear arm portion 74 are two locating links, namely a forward link 76 and a rear link 78. The forward link 76 is pivotally connected by its lower end at 80 at a more forward location on the arm 74, and extends generally upwardly to pivotally connect to the lower side of its related flap 34 at a forward location 82. The rear link 78 is pivotally connected by its lower end to the arm 74 at a lower location 84, spaced a moderate distance rearwardly of the pivot location 80. The upper end of the link 78 connects to the lower side of its related flap member 34 at 86. The upper pivot locations 82 and 86 are spaced from one another a substantially greater distance than are the lower pivot locations 80 and 84.

A power actuator 88, in the form of a hydraulic jack is connected between the forward end of the mounting arm 64 and the forward link 76 to move its flap member 34 about the two pivot links 76 and 78. The arrangement of the locating links 76 and 78 might be described as having a twofold function. First, it causes simultaneous rearward travel and rotation of its flap 34 as it is moved from its stowed position. Second, the rotational movement is such that as the rearward movement proceeds further toward its fully deployed position, the instantaneous center about which such rotation takes place moves forwardly and then upwardly toward the location of the cove trailing edge 60. This enables the portion of the upper surface 38 of the flap 34 to remain closely adjacent to and also generally tangent to the wing surface 30 at the cove trailing edge 60. The instantaneous center of rotation determined by the two links 76 and 78 is illustrated in FIG. 4 at 90a, in FIG. 5 at 90b, and in FIG. 6 at 90c. The wing surface 30 at the cove trailing edge 60 is made moderately flexible and is spring loaded downwardly so that it can deflect to remain against the upper surface 38 of the flap 34 to make up for any inaccuracy in the matching of the curvature of the flap surface 38 and the movement of the instantaneous center of rotation 90. In the particular arrangement shown herein, the cove trailing edge 60 drops moderately below the ideal aerodynamic contour when the flap 34 is in the position of FIG. 4. However, this small deviation has no significant effect in aerodynamic performance. A suitable fairing, indicated 91, is provided for the actuating mechanism 62.

As shown herein, there are four vortex generators 35 positioned a moderate distance forwardly of the cove trailing edge 60. These vortex generators 35 are longitudinally aligned and extend upwardly from the upper wing surface 30. The vortex generators 35 are aerodynamically contoured so that that portion of the jet exhaust which is immediately adjacent the wing upper surface 30 is caused to diverge laterally. Thus, the vortex generators 35 act as semi-span wings, shedding strong tip vortices which promote mixing of the jet core layer with the boundary layer next to the surface. Energy transport created by the mixing delays boundary layer separation.

Figure 2:
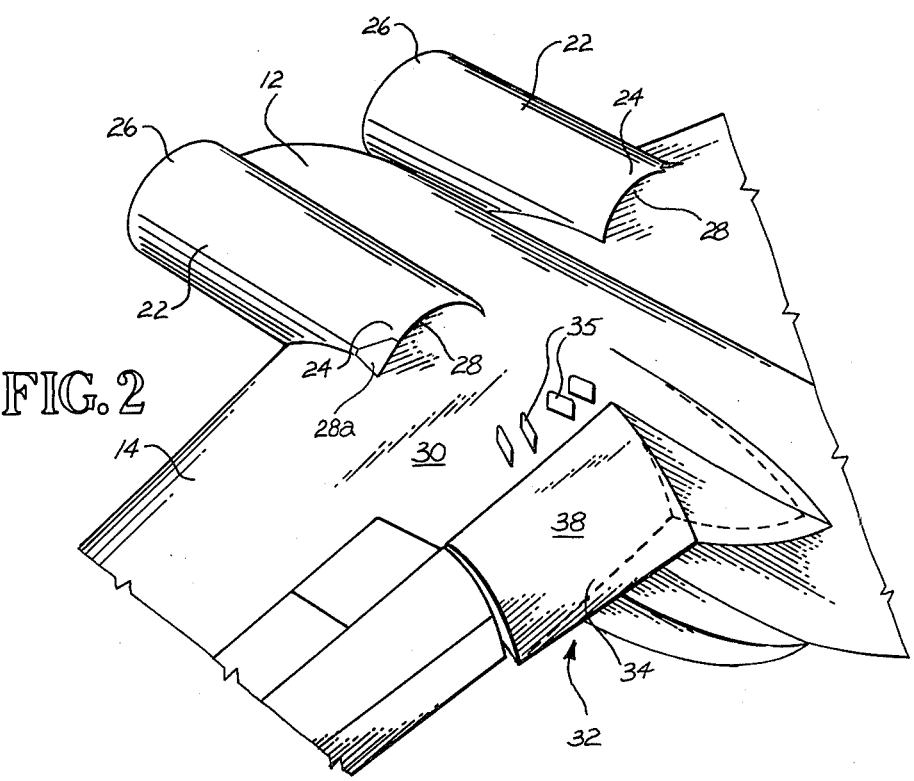
FIG. 2 is an isometric view similar to FIG. 1, but showing the flap configuration of the present invention in a larger scale.
Figure 3:
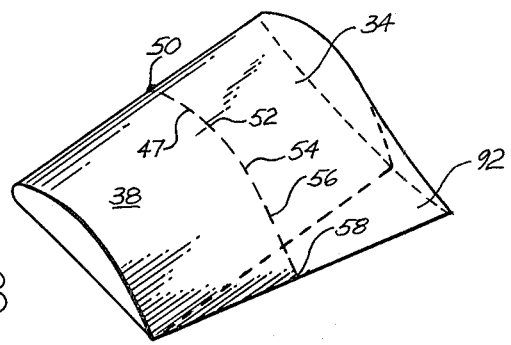
FIG. 3 is an isometric view of a single upper surface blown flap utilized in the present invention and illustrating the particular contour of this flap at the location adjacent the fuselage of the aircraft.

Another feature of the present invention is the spanwise taper and twist of the upper surface blown flap 34, as shown in FIG. 3. With the upper surface blown flap 32 in its extended position as shown in FIG. 2, the side of the airplane fuselage presents a surface normal to the Coanda surface 38 of the flap 34, thus forming a 90° corner. Boundary layer or viscous effects in this corner impede flow turning over the surface 34, resulting in local flow separation. The taper and twist shown in FIG. 3 are designed to relax the adverse pressure gradient next to the side of the fuselage, and in practice reduce the extent of local flow separation.

Thus, the length of the chordwise section would be larger at the inboard side of the flap 34 and smaller at the outboard side. Also, the trailing edge portion at the inboard side is "warped" moderately, as at 92, in a manner that the downward slope of the upper surface at the rear inboard section 92 is less than the downward slope at corresponding chord-length locations at the midspan 47 and at the outboard end of the flap 34. The precise degree of "twist" or "warp" of the rear inboard section 92 will depend upon various things, such as the configuration of the adjacent fuselage structure and cruise efficiency considerations. However, it is to be understood that it is well within the capability of the aerodynamicist of ordinary skill to tailor the rear inboard flap portion 92 to optimize flow over that area.

To summarize the operation of the present invention, when the airplane 10 is traveling in its cruise mode, the two flaps 34 remain in their stowed position as shown in FIG. 4. As greater lift is needed for either taking off or landing, the actuators 88 are operated to move the two flaps 34 rearwardly to the desired position. The further downwardly and rearwardly that the flaps 34 are moved, the greater is the vertical thrust which is developed because of the greater downward deflection of the jet exhaust. When the airplane is following a glide path for landing, the position of the two flaps 34 can be varied to provide the proper horizontal and vertical force components to maintain the airplane 10 on its glide path. It is to be understood that the actuating mechanisms 62 could be provided with slotting capability by moving the flaps 34 in their deployed position out of contact with the cove trailing edges 60 to provide slots over each flap 34, this being done in the event of a power failure. This is not shown herein for convenience of illustration.

Figure 7:
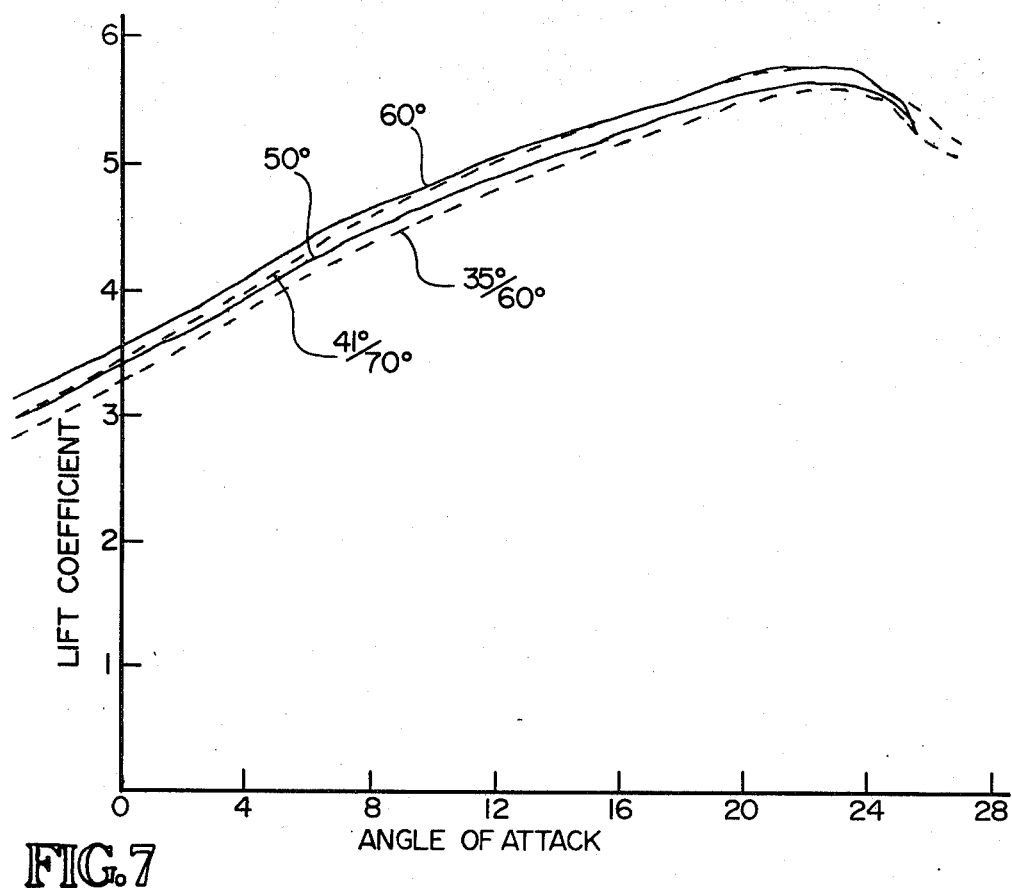
Figure 8:
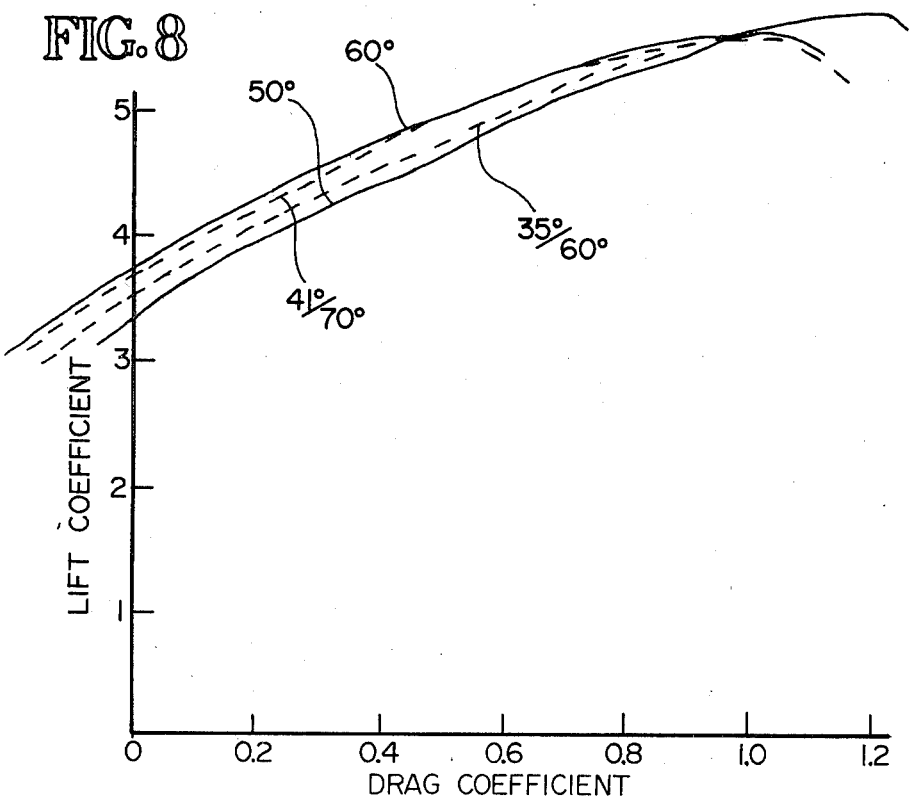
Figure 9:
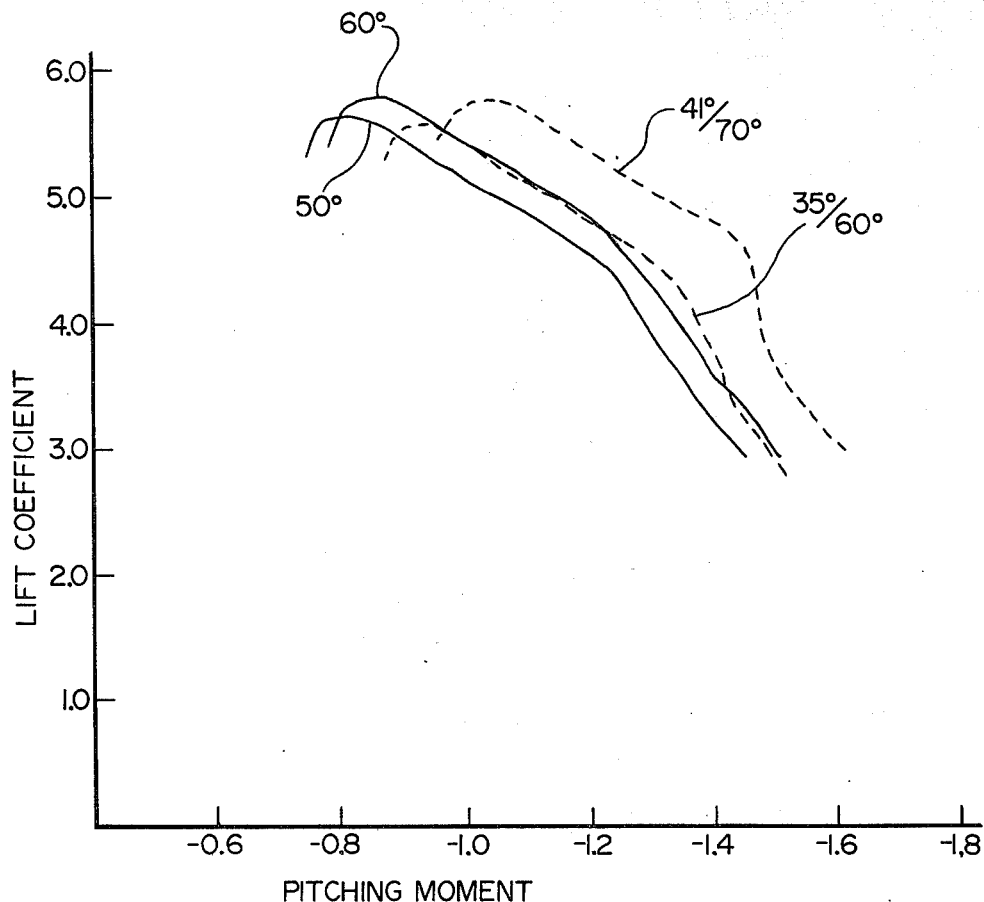
Figure 10:
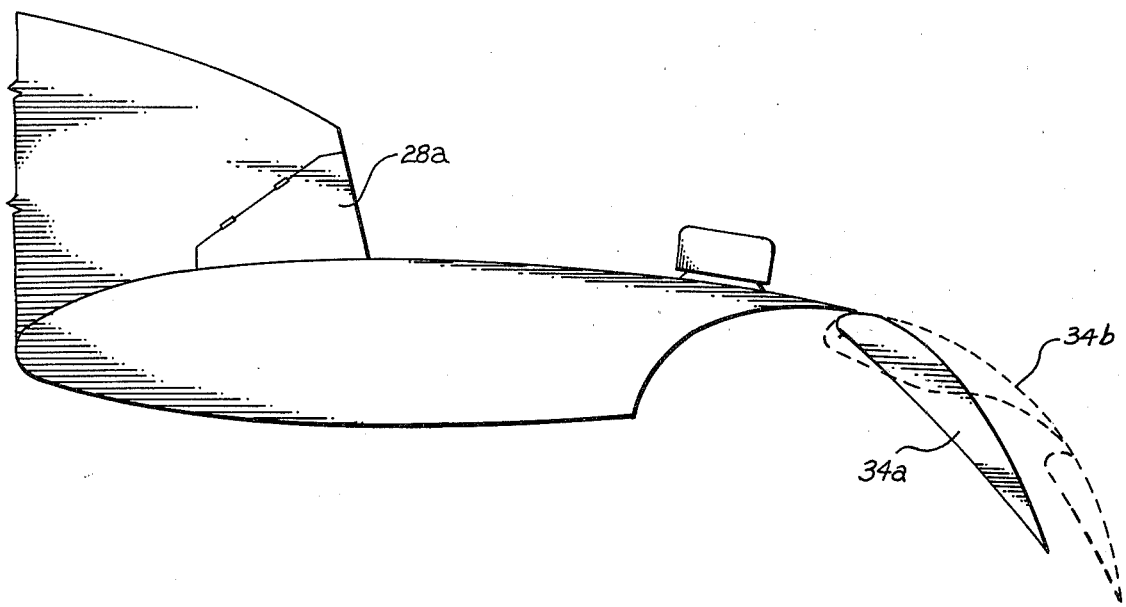
FIG. 10 illustrates schematically the two systems which are compared to the graphs in FIGS. 7–9, with the system of the present invention being indicated somewhat schematically in solid lines and the prior art YC-14 system being shown somewhat schematically in broken lines.

With regard to the specific operating characteristics of the present invention, reference is now made to the graphs shown in FIGS. 7 through 9. A comparison between the operating characteristics of the present invention and those of the prior art YC-14 airplane were made by construction of 0.06 scale full airplane models and testing these in the Boeing V/STOL wind tunnel. Two full airplane models, identical in every way except for different upper surface blown flaps were tested with simulated jet exhaust at the same thrust and forward speed conditions representing landing approach. The first model had the upper surface blown flap configuration of the prior art YC-14 airplane, while the second model had the upper surface blown flap configuration of the present invention as shown in FIG. 11. The test results are compared in FIGS. 7, 8 and 9 at full deflection and ten degrees from full flap deflection. For the prior art YC-14 flaps, the full deflection is 41° on the main segment and 70° on the aft segment. For the present invention, the full deflection is 60°. The principal difference in the two flap configurations can be seen in FIG. 10, where the flap of the present invention is shown in full lines at 34a, and the two segment flap of the prior art YC-14 flap being shown in broken lines at 34b. In these tests the gross coefficient was equal to 0.5 for each engine.

In the graph in FIG. 7, the lift coefficient of the wing and flap is represented on the vertical axis, and the angle of attack is represented on the horizontal axis. The solid lines represent the test results of the flap of the present invention, while the broken lines represent those of the YC-14 type flap. It can readily be seen that the lift coefficient developed by the flap of the present invention was at least as great as, or moderately greater than, that developed by the YC-14 type flap. This was accomplished with the flap of the present invention having a substantially smaller surface area.

With reference to the graph of FIG. 8, the lift coefficient is plotted on the vertical axis, and the drag coefficient is plotted on the horizontal axis. It will be noted that the solid lines, representing the flap of the present invention, are spaced further apart than are the broken lines, which represent the YC-14 type flap. Thus, it can be readily seen that for a 10° deflection of the trailing edge flap of the present invention, a substantially greater change in the drag coefficient is obtained, as compared with a 10° deflection of the YC-14 type flap. For example, let it be assumed that the wing has a lift coefficient of 4.0 and the flap of the present invention is moved from its 60° to its 50° setting. It can be seen that the drag coefficient is reduced by a value of 0.12. On the other hand, the drag coefficient of the YC-14 type flap is reduced by a value of 0.05.

The significance of the results of the graph of FIG. 8 is that the flap of the present invention is able to generate a greater change in drag coefficient for a given change in angular position of the flap. When an airplane is following a glide path, by varying the drag the forward progress of the airplane can be either augmented or retarded by either decreasing or increasing the drag, respectively. The change in drag at a constant lift level results in a change in flight path. Thus, the flap of the present invention provides greater control of the aircraft flight path through modulating the angle of the upper surface blown flap. Rapid response of the upper surface blown flap is achievable, while comparable response of engine thrust is limited by spin up time. Therefore, flight path control through upper surface blown flaps is preferred.

Finally, with respect to the graph in FIG. 9, the lift coefficient is again plotted on a vertical axis, and the pitching moment is plotted on the horizontal axis. It can readily be seen that for a given lift coefficient and for comparable angular settings of the flaps, the flap configuration of the present invention has a significantly smaller pitching moment in comparison with the YC-14 type flap.

To appreciate the significance of the present invention, it should be recognized that the improved aerodynamic results illustrated in the graphs of FIGS. 7–9 were obtained with a flap configuration having a chord length and aerodynamic surface area substantially smaller than that of the YC-14 type flap. This enables the flap of the present invention to be made as a single member. The test results disclosed in the graph of FIG. 7 indicate that the smaller simplified flap of the present invention has a lift coefficient at least as great as that provided with the prior art flap. The test results disclosed in the graph of FIG. 8 illustrates that the flap of the present invention provides greater control capability in being able to vary drag to a greater extent for a given change of flap angle. The test results illustrated in the graph of FIG. 9 indicate that the pitching moment created by the flap system of the present invention is of a relatively smaller magnitude, thus easing the horizontal tail requirement.

It has been found that with the combination of the flap configuration and vortex generators, as described herein, it is possible to provide the jet exhaust in a configuration with a greater vertical dimension and thus alleviate drag in the cruise mode. Yet this same jet exhaust can be effectively turned around a tighter radius of curvature during full flap deflection. In the prior art YC-14 airplane, it was found to be possible to use a discharge nozzle for the jet engine where the aspect ratio was approximately 2.5. (Aspect ratio is equal to the effective flow area of the nozzle divided by the square of the maximum height of the nozzle. Thus, with a lower aspect ratio, the jet is relatively thicker.) With the present invention, it has been found possible to employ a nozzle having an aspect ratio as low as 2.25, and possibly as low as 2.0. (This aspect ratio is measured with the nozzle door 28a in its open position.)

Further, even with this lower aspect ratio of the discharge nozzle in the present invention, it is possible to utilize a substantially smaller minimum turning radius than with the prior art YC-14 airplane. The minimum turning radius of the flap of the present invention in a full scale airplane such as the YC-14, is fifty inches at the knee of the flap, with this radius of curvature increasing to sixty inches at the transition location 54 on the flap surface 38. In contrast to this, the radius of curvature of the prior art YC-14 flap (which is a constant curvature flap) is sixty eight inches. In the configuration shown herein, the radius of curvature at location 54 would be between about ten to thirty percent greater than at location 50, and desirably about one fifth greater.

The effectiveness of the present invention in turning the jet flow can possibly best be described in terms of the ratio of the height of the jet discharge nozzle to the minimum radius of curvatuve. To the best knowledge of the applicant, the prior art was able to achieve a nozzle height to turning ratio of just slightly greater than one-half. (In the prior art YC-14 airplane, this ratio was 0.54) in the particular configuration of the present invention shown herein, it is possible to obtain a nozzle height to radius of curvature ratio as high as 0.72. This is achieved where the by-pass ratio of the engine is approximately 4.0. With higher engine by-pass ratios, this ratio could be as high as 1.0. Thus in the present invention, the ratio of the nozzle height (i.e. the height of the jet exhaust nozzle) to the minimum radius of curvature of the flap would be greater than ½, desirably at least as high as 0.7, and in some instances as high as 1.0.

FIG. 11 illustrates the flap of the present invention actually tested in the wind tunnel as described earlier herein. The dimensions of this flap are given in the following table:

| STATION INCHES | Z UPPER | | Z LOWER | |
| --- | --- | --- | --- | --- |
| 0 | −.699 | | −.699 | |
| .066 | −.549 | | −.739 | |
| .096 | −.512 | | −.736 | |
| .167 | −.444 | | | |
| .266 | −.354 | | | |
| .466 | −.197 | | −.635 | |
| .666 | −.064 | | | |
| .866 | .046 | | | |
| 1.066 | .138 | | −.488 | |
| 1.266 | .212 | | | |
| 1.466 | .272 | | | |
| 1.666 | .319 | | | |
| 1.866 | .355 | | −.319 | |
| 2.066 | .372 | | | |
| 2.266 | .377 | | | |
| 2.466 | .369 | | | |
| | (−1) | (−2) | (−1) | (−2) |
| 2.666 | .354 | .359 | −.191 | −.191 |
| 2.866 | .330 | | | |
| 3.066 | .297 | | | |
| 3.241 | .260 | .291 | −.121 | −.121 |
| 3.645 | .184 | | | |
| 4.081 | .101 | 193 | −.056 | −.056 |
| 4.656 | −.020 | .129 | −.035 | −.035 |
| 5.736 | | 0 | | −.015 |

What is claimed is:

1. An upper surface blown powered lift system comprising:
   a. an airfoil assembly having a chordwise axis and a leading edge and a trailing edge, said airfoil assembly providing a substantially continuous upper aerodynamic surface, said airfoil assembly comprising:
      1. an airfoil having an upper airfoil surface that has a leading edge and a trailing edge and forms a forward portion of said upper aerodynamic surface, said airfoil having a cove portion at the trailing edge,
      2. a flap means having an extended position extending downwardly and rearwardly from the trailing edge of the airfoil, with said flap means having an upper flap surface that forms a rear portion of said upper aerodynamic surface, and a trailing edge portion which forms the trailing edge of the airfoil assembly, said flap means having a stowed position in said cove portion,
   b. jet means to direct a high velocity jet flow rearwardly over the upper flap surface,
   c. vortex generating means mounted rearwardly of said jet means to produce vortices in the jet flow over the upper flap surface,
   d. said upper flap surface being curved in a generally chordwise direction and having a forward upper flap surface portion and a rear flap surface portion, said forward flap surface portion being curved in a relatively tight curve with overall lesser radius of curvature, with the forward upper flap surface portion having its radius of curvature gradually increasing from a forward end to a rear end of said forward upper flap surface portion, said rear upper flap surface portion being curved in a more relaxed curve having overall greater radius of curvature, said upper flap surface being characterized in that a forward half of the upper flap surface has a total degree of curvature greater than that of a rear half of said upper flap surface and causes greater deflection of said jet flow than the rear half of the upper flap surface,
   e. actuating means to move said flap means between its stowed position and its extended position, and also to intermediate positions between its stowed and extended positions, said actuating means being arranged to rotate said flap means rearwardly with a moveable instantaneous center of rotation, with the upper flap surface being adjacent to and generally aerodynamically aligned with the airfoil upper surface at said cove portion, whereby said flap member can be placed in the stowed position for travel in cruise mode, and deployed downwardly to create a desired downward deflection of the jet flow, in a manner that jet flow travelling at the forward end of the flap means travels over said forward upper flap surface portion in a curved path of lesser radius of curvature, and jet flow travelling over said rear end of the flap member travels in a curved path of greater radius of curvature.

2. The system as recited in claim 1, where the upper flap surface is arranged relative to the actuating means so that a portion of the upper flap surface adjacent said cove portion during deployment of said flap means from one position to another position has a varying curvature, with a change in radius of curvature of said upper flap surface generally matching a change in the instantaneous center of rotation of the actuating means, whereby that portion of the upper flap surface adjacent the trailing edge of the airfoil is aerodynamically aligned with the trailing edge of the airfoil as said flap means is deployed from the stowed position to the extended position.

3. The system as recited in claim 2, wherein the upper flap surface has a minimum radius of curvature at the forward upper flap surface portion, and said jet means has an exhaust nozzle with a predetermined maximum height dimension, said exhaust nozzle being so arranged relative to the minimum radius of curvature of the upper flap surface that there is a nozzle height to minimum radius of curvature ratio greater than approximately one half.

4. The system as recited in claim 3, wherein said ratio is at least as high as approximately ¾.

5. The system as recited in claim 4, wherein said ratio is at least as high as approximately 1.

6. The system as recited in claim 1, wherein said upper flap surface has a minimum radius of curvature at the forward upper flap surface portion, and said jet means has an exhaust nozzle with a predetermined maximum height dimension, said exhaust nozzle being so arranged relative to the minimum radius of curvature of the upper flap surface that there is a nozzle height to minimum radius of curvature ratio greater than approximately one half.

7. The system as recited in claim 6, wherein said ratio is at least as high as approximately ¾.

8. The system as recited in claim 7, wherein said ratio is at least as high as approximately 1.

9. The system as recited in claim 1, wherein said jet means has an exhaust nozzle having an effective nozzle area and a maximum height dimension, said exhaust nozzle having an aspect ratio which is equal to the effective nozzle area divided by the square of the height dimension, said aspect ratio being less than two and a half.

10. The system as recited in claim 9, wherein said aspect ratio is no greater than approximately two and a quarter.

11. The system as recited in claim 10, wherein said aspect ratio is no greater than approximately 2.

12. The system as recited in claim 1, wherein
 a. said upper flap surface has a minimum radius of curvature at the forward upper flap surface portion, and said jet means has an exhaust nozzle with a predetermined maximum height dimension, said exhaust nozzle being so arranged relative to the minimum radius of curvature of the upper flap surface that there is a nozzle height to minimum radius curvature ratio greater than approximately one-half,
 b. said exhaust nozzle has an effective nozzle area, said exhaust nozzle further having an aspect ratio which is equal to the effective nozzle area divided by the square of the height dimension, said aspect ratio being less than two and one-half.

13. The system as recited in claim 12, wherein
 a. said nozzle hieght to minimum radius of curvature ratio is at least as high as approximately three quarters,
 b. said aspect ratio is no greater than approximately two and one-quarter.

14. The system as recited in claim 1, further comprising:
 a. a body member,
 b. said airfoil having an inboard portion connected to said body member and an outboard portion, with the flap means in its extended position the upper flap surface having a downward slope at a rear inboard portion along a chordlength thereof less than a downward slope at the outboard portion at rear chordlength locations corresponding to rear chordlength locations at the inboard portion.

15. An upper surface blown powered lift system comprising:
 a. an airfoil assembly having a chordwise axis and a leading edge and a trailing edge, said airfoil assembly providing a substantially continuous upper aerodynamic surface, said airfoil assembly comprising:
  1. an airfoil having an upper airfoil surface that has a leading edge, and a trailing edge and forms a forward portion of said upper aerodynamic surface, said airfoil having a cove portion at the trailing edge,
  2. a flap means having an extended position extending downwardly and rearwardly from the trailing edge of the airfoil, with said flap means having an upper flap surface that forms a rear portion of said upper aerodynamic surface and a trailing edge portion which forms the trailing edge of the airfoil assembly, said upper flap surface comprising a forward upper flap surface portion and a rear upper flap surface portion, said flap means being adapted to be positioned in a stowed position in said cove portion for cruise mode of said airfoil assembly, with the forward upper flap surface portion being positioned in said cove portion at the trailing edge of the airfoil, and with the rear upper flap surface portion forming a continuous rearward extension of the upper airfoil surface for cruise mode,
 b. jet means to direct a high velocity jet flow rearwardly over the upper flap surface,
 c. vortex generating means mounted rearwardly of said jet means to produce vortices in the jet flow over the upper flap surface,
 d. said upper flap surface being curved in a generally chordwise direction, said forward upper flap surface portion being curved in a relatively tight curve with overall lesser radius of curvature, said rear upper flap surface portion being curved in a more relaxed curve having overall greater radius of curvature, said radius of curvature increasing rearwardly along said upper flap surface, said upper flap surface being characterized in that a forward half of the upper flap surface has a total degree of curvature greater than that of a rear half of said upper flap surface and causes greater deflection of said jet flow than the rear half of the upper flap surface, the forward upper flap surface portion having its radius of curvature gradually increasing from a forward end to a rear end of said forward upper flap surface portion,
 e. actuating means to move said flap means between its stowed position and its extended position, and also to intermediate positions between its stowed and extended positions, said actuating means being arranged to rotate said flap means rearwardly with a moveable instantaneous center of rotation, with the upper flap surface being adjacent to and generally aerodynamically aligned with the airfoil upper surface at said cove portion, whereby said flap member can be placed in the stowed position for travel in cruise mode, and deployed downwardly to create a desired downward deflection of the jet flow, in a manner that jet flow travelling at the forward end of the flap means travels over said forward upper flap surface portion in a curved path of gradually increasing radius of curvature, and jet flow travelling over said rear end of the flap member travels in a curved path of greater radius of curvature.

16. The system as recited in claim 15, where the upper flap surface is arranged relative to the actuating means so that a portion of the upper flap surface adjacent said cove portion during deployment of said flap means from one position to another position has a varying curvature, with a change in radius of curvature of said upper flap surface generally matching a change in the instantaneous center of rotation of the actuating means, whereby that portion of the upper flap surface adjacent the trailing edge of the airfoil is aerodynamically aligned with the trailing edge portion of the airfoil as said flap means is deployed from the one position to the other position.

17. The system as recited in claim 16, wherein the radius of curvature of the rear end of said forward upper flap surface portion is between 10% to 30% greater than radius of curvature of the front end of said forward upper flap surface portion.

18. The system as recited in claim 16, wherein the radius of curvature of the rear end of said forward upper flap surface portion is about 1/5th greater than radius of curvature at the front end of said forward upper flap surface portion.

19. The system as recited in claim 16, wherein said forward upper flap surface portion is contoured in a spiral curve.

20. The system as recited in claim 15, wherein
a. the radius of curvature of the rear end of said forward upper flap surface portion is between 10% to 30% greater than radius of curvature of the front end of said forward upper flap surface portion,
b. said forward upper flap surface portion is contoured in a spiral curve.

21. The system as recited in claim 16, wherein said upper flap surface has a minimum radius of curvature at the forward upper flap surface portion, and said jet means has an exhaustnozzle with a predetermined maximum height dimension, said exhaust nozzle being so arranged relative to the minimum radius of curvature of the upper flap surface that there is a nozzle height to minimum radius of curvature ratio greater than approximately one half.

22. The system as recited in claim 21, wherein said ratio is at least as high as approximately ¾.

23. The system as recited in claim 22, wherein said ratio is at least as high as approximately 1.

24. The system as recited in claim 15, where said upper flap surface has a minimum radius of curvature at the forward upper flap surface portion, and said jet means has an exhaust nozzle with a predetermined maximum height dimension, said exhaust nozzle being so arranged relative to the minimum radius of curvature of the upper flap surface that there is a nozzle height to minimum radius of curvature ratio greater than approximately one half.

25. The system as recited in claim 24, wherein said ratio is at least as high as approximately ¾.

26. The system as recited in claim 25, wherein said ratio is at least as high as approximately 1.

27. The system as recited in claim 15, wherein said jet means has an exhaust nozzle having an effective nozzle area and a maximum height dimension, said exhaust nozzle having an aspect ratio which is equal to the effective nozzle area divided by the square of the height dimension, said aspect ratio being less than two and a half.

28. The system as recited in claim 27, wherein said aspect ratio is no greater than approximately two and a quarter.

29. The system as recited in claim 28, wherein said aspect ratio is no greater than approximately 2.

30. The system as recited in claim 15, wherein
a. said upper flap surface has a minimum radius of curvature at the forward upper flap surface portion, and said jet means has an exhaust nozzle with a predetermined maximum height dimension, said exhaust nozzle being so arranged relative to the minimum radius of curvature of the upper flap surface that there is a nozzle height to minimum radius curvature ratio greater than approximately one-half,
b. said exhaust nozzle has an effective nozzle area, said exhaust nozzle further having an aspect ratio which is equal to the effective nozzle area divided by the square of the height dimension, said aspect ratio being less than two and one-half.

31. The system as recited in claim 30, wherein
a. said nozzle height to minimum radius of curvature ratio is at least as high as approximately three quarters,
b. said aspect ratio is no greater than approximately two and one-quarter.

32. The system as recited in claim 15, further comprising:
a. a body member,
b. said airfoil having an inboard portion connected to said body member and an outboard portion, with the flap means in its deployed position the upper flap surface having a downward slope at a rear inboard portion along a chordlength thereof less than a downward slope at the outboard portion at rear chordlength locations corresponding to rear chordlength locations at the inboard portion.

33. In an aircraft having a fuselage, an upper surface blown powered lift system for said aircraft, comprising:
a. a pair of airfoil assemblies positioned on opposite sides of said fuselage, each airfoil assembly having a chordwise axis and a leading edge and a trailing edge, each airfoil assembly providing a substantially continuous upper aerodynamic surface, each airfoil assembly comprising:
 1. an airfoil having an upper airfoil surface that has a leading edge and a trailing edge and forms a forward portion of said upper aerodynamic surface, said airfoil having a cove portion at the trailing edge,
 2. a flap means having an extended position extending downwardly and rearwardly from the trailing edge of the airfoil, with said flap means having an upper flap surface that forms a rear portion of said upper aerodynamic surface, and a trailing edge portion which forms the trailing edge of the airfoil assembly, said flap means having a stowed position in said cove portion,
b. a pair of jet engines on opposite sides of the fuselage, with each jet engine arranged to direct a high velocity jet flow rearwardly over its related flap means, c. two vortex generating means, each mounted rearwardly of its related jet engine to produce vortices in the jet flow over its related upper flap surface,
d. each upper flap surface being curved in a generally chordwise direction and having a forward upper flap surface portion and a rear flap surface portion, said forward flap surface portion being curved in a relatively tight curve with overall lesser radius of curvature, with the forward upper flap surface portion having its radius of curvature gradually increasing from a forward end to a rear end of said forward upper flap surfaceportion, said rear upper flap surface portion being curved in a more relaxed curve having overall greater radius of curvature, said upper flap surface being characterized in that a forward half of the upper flap surface has a total degree of curvature greater than that of a rear half of said upper flap surface and causes greater deflection of said jet flow than the rear half of the upper flap surface,
e. a pair of actuating means to move its related flap means between its stored position and its extended position, and also to intermediate positions between its stowed and extended positions, said actuating means being arranged to rotate its flap means rearwardly with a moveable instantaneous center of rotation, with the upper flap surface being adjacent to and generally aerodynamically aligned with the airfoil upper surface at said cove portion, whereby each flap member can be placed in the stowed position for travel in cruise mode, and deployed downwardly to create a desired downward deflection of the jet flow, in a manner that jet flow travelling at the forward end of the flap means travels over said forward upper flap surface portion in a curved path of gradually increasing lesser radius of curvature, and jet flow travelling over said rear end of the flap member travels in a curved path of greater radius of curvature.

34. The system as recited in claim 33, where the upper flap surface of each flag means is arranged relative to its related actuating means so that a portion of the upper flap surface adjacent said cove portion during deployment of said flap means from one position to another position has a varying curvature, with a change in radius of curvature of said upper flap surface generally matching a change in the instantaneous center of rotation of the actuating means, whereby that portion of the upper flap surface adjacent the trailing edge of the airfoil is aerodynamically aligned with the trailing edge portion of the airfoil as said flap means is deployed from the one position to the other position.

35. The system as recited in claim 34, wherein the radius of curvature of the rear end of each forward upper flap surface portion is between 10% and 30% greater than radius of curvature of the front end of said forward upper flap surface portion.

36. The system as recited in claim 34, wherein the radius of curvature of the rear end of each forward upper flap surface portion is about 1/5th greater than radius of curvature at the front end of said forward upper flap surface portion.

37. The system as recited in claim 34, wherein each forward upper flap surface portion is contoured in a spiral curve.

38. The system as recited in claim 33, wherein
a. the radius of curvature of the rear end of each forward upper flap surface portion is between 10% to 30% greater than radius of curvature of the front end of said forward upper flap surface portion,
b. each forward upper flap surface portion is contoured in a spiral curve.

39. The system as recited in claim 34, wherein each upper flap surface has a minimum radius of curvature at the forward upper flap surface portion, and each jet means has an exhaust nozzle with a predetermined maximum height dimension, said exhaust nozzle being so arranged relative to the minimum radius of curvature of the upper flap surface that there is a nozzle height to minimize radius of curvature ratio greater than approximately one half.

40. The system as recited in claim 39, wherein said ratio is at least as high as approximately $\frac{3}{4}$.

41. The system as recited in claim 40, wherein said ratio is at least as high as approximately 1.

42. The system as recited in claim 33, where each upper flap surface has a minimum radius of curvature at the forward upper flap surface portion, and each jet means has an exhaust nozzle with a predetermined maximum height dimension, said exhaust nozzle being so arranged relative to the minimum radius of curvature of the upper flap surface that there is a nozzle height to minimum radius of curvature ratio greater than approximately one half.

43. The system as recited in claim 42, wherein said ratio is at least as high as approximatey $\frac{3}{4}$.

44. The system as recited in claim 43, wherein said ratio is at least as high as approximately 1.

45. The system as recited in claim 37, wherein each jet means has an exhaust nozzle having an effective nozzle area and a maximum height dimension, said exhaust nozzle having an aspect ratio which is equal to the effective nozzle area divided by the square of the height dimension, said aspect ratio being less than two and a half.

46. The system as recited in claim 45, wherein said aspect ratio is no greater than approximately two and a quarter.

47. The system as recited in claim 46, wherein said aspect ratio is no greater than approximately 2.

48. The system as recited in claim 33, wherein
a. each upper flap surface has a minimum radius of curvature at the forward upper flap surface portion, and each jet means has an exhaust nozzle with a predetermined maximum height dimension, said exhaust nozzle being so arranged relative to the minimum radius of curvature of the upper flap surface that there is a nozzle height to minimum radius curvature ratio greater than approximately one-half,
b. each exhaust nozzle has an effective nozzle area, said exhaust nozzle further having an aspect ratio which is equal to the effective nozzle area divided by the square of the height dimension, said aspect ratio being less than two and one-half.

49. The system as recited in claim 48, hwerein
a. said nozzle height to minimum radius of curvature ratio is at least as high as approximately three quarters,
b. said aspect ratio is no greater than approximately two and one-quarter.

50. The system as recited in claim 33, wherein each airfoil has an inboard portion connected to said fuselage and an outboard portion, with each flap means in its deployed position the upper flap surface has a downward slope at a rear inboard portion along a chordlength thereof less than a downward slope at the outboard portion at rear chordlength locations corresponding to rear chordlength locations at the inboard portion.

51. A method of utilizing an upper surface blown powered lift system, said method comprising:
   a. providing an airfoil assembly having a chordwise axis and a leading edge and a trailing edge, said airfoil assembly providing a substantially continuous upper aerodynamic surface, said airfoil assembly comprising:
      1. an airfoil having an upper airfoil surface that has a leading edge and a trailing edge and forms a forward portion of said upper aerodynamic surface, said airfoil having a cove portion at the trailing edge,
      2. a flap means having an extended position extending downwardly and rearwardly from the trailing edge of the airfoil, with said flap means having an upper flap surface that forms a rear portion of said upper aerodynamic surface, and a trailing edge portion which forms the trailing edge of the airfoil assembly, said flap means having a stowed position in said cover portion,
   b. directing a high velocity jet flow from jet means rearwardly over the upper flap surface,
   c. providing vortex generating means mounted rearwardly of said jet means to produce vortices in the jet flow over the upper flap surface,
   d. providing the upper flap surface to be curved in a generally chordwise direction, with the upper flap surface having a forward upper flap surface portion and a rear flap surface portion, said forward flap surface portion being curved in a relatively tight curve with overall lesser radius of curvature, with the forward upper flap surface portion having its radius of curvature gradually increasing from a forward end to a rear end of said forward upper flap surface portion, said rear upper flap surface portion being curved in a more relaxed curve having overall greater radius of curvature, said upper flap surface being characterized in that a forward half of the upper flap surface has a total degree of curvature greater than that of a rear half of said upper flap surface and causes greater deflection of said jet flow than the rear half of the upper flap surface,
   e. rotating said flap means between its stowed position and its extended position, and also to intermediate positions between its stowed and extended positions, in a manner that said flap means rotates about a moveable instantaneous center of rotation, with the upper flap surface being adjacent to and generally aerodynamically aligned with the airfoil upper surface at said cove portion,
whereby said flap member can be placed in the stowed position for travel in cruise mode, and deployed downwardly to create a desired downward deflection of the jet flow, in a manner that jet flow travelling at the forward end of the flap means travels over said forward upper flap surface portion in a curved path of gradually increasing lesser radius of curvature, and jet flow travelling over said rear end of the flap member travels in a curved path of greater radius of curvature.

52. The method as recited in claim 31, where the upper flap surface is arranged so that a portion of the upper flap surface adjacent said cove portion during deployment of said flap means from one position to another position has a varying curvature, said method further comprising rotating the flap means with a change of radius of curvature of said upper flap surface generally matching a change in the instantaneous center of rotation of the actuating means, whereby that portion of the upper flap surface adjacent the trailing edge of the airfoil is aerodynamically aligned with the trailing edge of the airfoil as said flap means is deployed from the stowed position to the extended position.

53. The method as recited in claim 52, wherein the upper flap surface has a minimum radius of curvature at the forward upper flap surface portion, and said jet means has an exhaust nozzle with a predetermined maximum height dimension, said exhaust nozzle being so arranged relative to the minimum radius of curvature of the upper flap surface that there is a nozzle height to minimum radius of curvature ratio greater than approximately one half.

54. The method as recited in claim 53, wherein said ratio is at least as high as approximately $\frac{3}{4}$.

55. The method as recited in claim 54, wherein said ratio is at least as high as approximately 1.

56. The method as recited in claim 51, wherein said upper flap surface has a minimum radius of curvature at the forward upper flap surface portion, and said jet means has an exhaust nozzle with a predetermined maximum height dimension, said exhaustnozzle being so arranged relative to the minimum radius of curvature of the upper flap surface that there is a nozzle height to minimum radius of curvature ratio greater than approximately one half.

57. The method as recited in claim 56, wherein said ratio is at least as high as approximately $\frac{3}{4}$.

58. The method as recited in claim 57, wherein said ratio is at least as high as approximately 1.

59. The method as recited in claim 51, wherein said jet means has an exhaust nozzle having an effective nozzle area and a maximum height dimension, said exhaust nozzle having an aspect ratio which is equal to the effective nozzle area divided by the square of the height dimension, said aspect ratio being less than two and a half.

60. The method as recited in claim 59, wherein said aspect ratio is no greater than approximately two and a quarter.

61. The method as recited in claim 60, wherein said aspect ratio is no greater than approximately 2.

62. The method as recited in claim 51, wherein
   a. said upper flap surface has a minimum radius of curvature at the forward upper flap surface portion, and said jet means has an exhaust nozzle with a predetermined maximum height dimension, said exhaust nozzle being so arranged relative to the minimum radius of curvature of the upper flap surface that there is a nozzle height to minimum radius curvature ratio greater than approximately one-half,
   b. said exhaust nozzle has an effective nozzle area, said exhaust nozzle further having an aspect ratio which is equal to the effective nozzle area divided by the square of the height dimension, said aspect ratio being less than two and one-half.

63. The system as recited in claim 62, wherein
   a. said nozzle height to minimum radius of curvature ratio is at least as high as approximately three quarters,
   b. said aspect ratio is no greater than approximately two and one-quarter.

64. A method of utilizing upper surface blown powered lift system, comprising:
   a. providing an airfoil assembly having a chordwise axis and a leading edge and a trailing edge, said airfoil assembly providing a substantially continuous upper aerodynamic surface, said airfoil assembly comprising:
      1. an airfoil having an upper airfoil surface that has a leading edge, and a trailing edge and forms a forward portion of said upper aerodynamic surface, said airfoil having a cove portion at the trailing edge,
      2. a flap means having an extended position extending downwardly and rearwardly from the trailing edge of the airfoil, with said flap means having an upper flap surface that forms a rear portion of said upper aerodynamic surface and a trailing edge portion which forms the trailing edge of the airfoil assembly, said upper flap surface comprising a forward upper flap surface portion and a rear upper flap surface portion, said flap means being adapted to be positioned in a stowed position in said cove portion for cruise mode of said airfoil assembly, with the forward upper flap surface portion being positioned in said cove portion at the trailing edge of the airfoil, and with the rear upper flap surface portion forming a continuous rearward extension of the upper airfoil surface for cruise mode,
   b. directing a high velocity jet flow by jet means rearwardly over the upper flap surface,
   c. providing vortex generating means mounted rearwardly of said jet means to produce vortices in the jet flow over the upper flap surface,
   d. said upper flap surface being curved in a generally chordwise direction, said forward upper flap surface portion being curved in a relatively tight curve with overall lesser radius of curvature, said rear upper flap surface portion being curved in a more relaxed curve having overall greater radius of curvature, said radius of curvature increasing rearwardly along said upper flap surface, said upper flap surface being characterized in that a forward half of the upper flap surface has a total defree of curvature greater than that of a rear half of said upper flap surface and causes greater deflection of said jet flow than the rear half of the upper flap surface, the forward upper flap surface portion having its radius of curvature gradually increasing from a forward end to a rear end of said forward upper flap surface portion,
   e. rotating said flap means between its stowed position and its extended position, and also to intermediate positions between its stowed and extended positions, in a manner that said flap means rotates with a moveable instantaneous center of rotation, with the upper flap surface being adjacent to and generally aerodynamically aligned with the airfoil upper surface at said cove portion,
whereby said flap member can be placed in the stowed position for travel in cruise mode, and deployed downwardly to create a desired downward deflection of the jet flow, in a manner that jet flow travelling at the forward end of the flap means travels over said forward upper flap surface portion in a curved path of gradually increasing lesser radius of curvature, and jet flow travelling over said rear end of the flap member gravels in a curved path of greater radius of curvature.

65. The method as recited in claim 64, where the upper flap surface is arranged so that a portion of the upper flap surface adjacent said cove portion during deployment of said flap means from one position to another position has a varying curvature, said method further comprising rotating the flap means with a change in radius of curvature of said upper flap surface generally matching a change in the instantaneous center of rotation of the actuating means, whereby that portion of the upper flap surface adjacent the trailing edge of the airfoil is aerodynamically aligned with the trailing edge portion of the airfoil as said flap means is deployed from the one position to the other position.

66. The method as recited in claim 65, wherein the radius of curvature of the rear end of said forward upper flap surface portion is between 10% to 30% greater than radius of curvature of the front end of said forward upper flap surface portion.

67. The method as recited in claim 65, wherein the radius of curvature of the rear end of the said forward upper flap surface portion is about 1/5th greater than radius of curvature at the front end of said forward upper flap surface portion.

68. The method as recited in claim 65, wherein said forward upper flap surface portion is contoured in a spiral curve.

69. The method as recited in claim 64, wherein
   a. the radius of curvature of the rear end of said forward upper flap surface portion is between 10% to 30% greater than radius of curvature of the front end of said forward upper flap surface portion,
   b. said forward upper flap surface portion is contoured in a spiral curve.

70. The method as recited in claim 64, wherein said upper flap surface has a minimum radius of curvature at the forward upper flap surface portion, and said jet means has an exhaust nozzle with a predetermined maximum height dimension, said exhaust nozzle being so arranged relative to the minimum radius of curvature of the upper flap surface that there is a nozzle height to minimum radius of curvature ratio greater than approximately one half.

71. The method as recited in claim 70, wherein said ratio is at least as high as approximately ¾.

72. The method as recited in claim 71, wherein said ratio is at least as high as approximately 1.

73. The method as recited in claim 64, where said upper flap surface has a minimum radius of curvature at the forward upper flap surface portion, and said jet means has an exhaust nozzle with a predetermined maximum height dimension, said exhaust nozzle being so arranged relative to the minimum radius of curvature of the upper flap surface that there is a nozzle height to minimum radius of curvature ratio greater than approximately one half.

74. The method as recited in claim 73, wherein said ratio is at least as high as approximately ¾.

75. The method as recited in claim 74, wherein said ratio is at least as high as approximately 1.

76. The method as recited in claim 63, wherein said jet means has an exhaustnozzle having an effective nozzle area and a maximum height dimension, said exhaust nozzle having an aspect ratio which is equal to the effective nozzle area divided by the square of the height dimension, said aspect ratio being less than two and a half.

77. The method as recited in claim 76, wherein said aspect ratio is no greater than approximately two and a quarter.

78. The system as recited in claim 76, wherein said aspect ratio is no greater than approximately 2.

79. The system as recited in claim 64, wherein
  a. said upper flap surface has a minimum radius of curvature at the forward upper flap surface portion, and said jet means has an exhaust nozzle with a predetermined maximum height dimension, said exhaust nozzle being so arranged relative to the minimum radius of curvature of the upper flap surface that there is a nozzle height to minimum radius curvature ratio greater than approximately one-half,
  b. said exhaustnozzle has an effective nozzle area, said exhaust nozzle further having an aspect ratio which is equal to the effective nozzle area divided by the square of the height dimension, said aspect ratio being less than two and one-half.

80. The method as recited in claim 79, wherein
  a. said nozzle height to minimum radius of curvature ration is at least as high as approximately three quarters,
  b. said aspect ratio is no greater than approximately two and one-quarter.

* * * * *